United States Patent [19]
DiSalvo

[11] 3,940,370
[45] Feb. 24, 1976

[54] METHOD OF MAKING POLYUREAS
[75] Inventor: Anthony L. DiSalvo, Stamford, Conn.
[73] Assignee: The United States of America as represented by the Secretary of the Army, Washington, D.C.
[22] Filed: Mar. 31, 1975
[21] Appl. No.: 563,763

[52] U.S. Cl. .................. 260/77.5 CH; 260/77.5 AT
[51] Int. Cl.$^2$ .................. C08G 18/08; C08G 18/71
[58] Field of Search ............................ 260/77.5 CH

[56] References Cited
UNITED STATES PATENTS
3,726,907  4/1973  Tesoro et al. .................. 260/77.5 R OTHER PUBLICATIONS
O.S. 1,520,270, Germany (Monsanto), May 14, 1969.

*Primary Examiner*—H. S. Cockeram
*Attorney, Agent, or Firm*—Nathan Edelberg; Lawrence E. Labadini; Robert P. Gibson

[57] ABSTRACT

A method of making a polyurea by reacting an aliphatic diamine with trimethylisocyanatosilane under pressure in a closed vessel at a temperature sufficiently high and for a time sufficiently long to produce a substantial quantity of the polyurea.

5 Claims, No Drawings

METHOD OF MAKING POLYUREAS

The invention described herein may be manufactured, used, and licensed by or for the Government for governmental purposes without the payment to me of any royalties thereon.

BACKGROUND OF THE INVENTION

This invention relates to a method of making polyureas.

Polyureas have been produced by reacting diamines with diisocyanates, by reacting diamines with urea, by reacting diamines with bisurethanes, by reacting diamines with carbon oxysulfide, and by reacting diamines or the dihydrochlorides thereof with phosgene. Various other special procedures have been employed for obtaining polyureas. However, these methods have all proven to be expensive either because of the low yields obtained or the high costs of the reactants and solvents required.

An object of the present invention is to provide a method of making polyureas in good yields and at relatively low cost.

Another object is to provide an improved method of making polyhexamethyleneurea.

Other objects and advantages will become apparent from the following description, and the novel features will be particularly pointed out in connection with the appended claims.

SUMMARY OF THE INVENTION

The invention involves the reacting of an aliphatic diamine with trimethylisocyanatosilane under pressure in a closed vessel at an elevated temperature and for a time sufficiently long to produce a high yield of a polyurea. the polyurea may be separated from by-products produced in the reaction by filtration of the cooled reaction mixture and may be purified by dissolving the crude reaction product in a solvent such as hexafluoroisopropanol and precipitating the polyurea from the solution by adding water thereto, filtering the precipitate, and drying it.

DESCRIPTION OF THE PREFERRED EMBODIMENT

Polyhexamethyleneurea, is prepared in accordance with the following example:

EXAMPLE 1

A dry Pyrex tube (25×2 cm), cooled with a mixture of dry ice and acetone, was charged under nitrogen with 0.880 g. of 1,6-hexanediamine (0.00757 mole) and 1.75 g. of trimethylisocyanatosilane (0.01519 mole). The Pyrex tube was hermetically sealed and then the tube and contents were heated at 175°C. for 17 hours. The Pyrex tube was cooled in a mixture of dry ice and acetone, then opened; and the solid was filtered off and dried in vacuo, yielding 1.060 g. of crude polyhexamethyleneurea, which represented a yield of approximately 98 percent. The crude polyhexamethyleneurea was purified by dissolving it in hexafluoroisopropanol and thereafter precipitating the polyhexamethyleneurea with water. The polyhexamethyleneurea was dried and the dried product found to correspond with a known sample prepared in accordance with U.S. Pat. No. 2,816,879.

The filtrate obtained in the first filtration described above, i.e. when the crude polyhexamethyleneurea was separated from the remaining contents of the Pyrex tube, was shown by gas-liquid chromatography to be a mixture of trimethylisocyanatosilane (0.647 g.), hexamethyldisilazane (0.315 g.), hexamethyldisiloxane (0.112 g.), bis (trimethylsilyl) carbodiimide (trace amount), and ammonia. Each of the above by-products was identified by comparison with the infrared spectra and gas-liquid chromatographic retention times for known samples of the compounds.

The reaction producing polyhexamethyleneurea may be represented as follows:

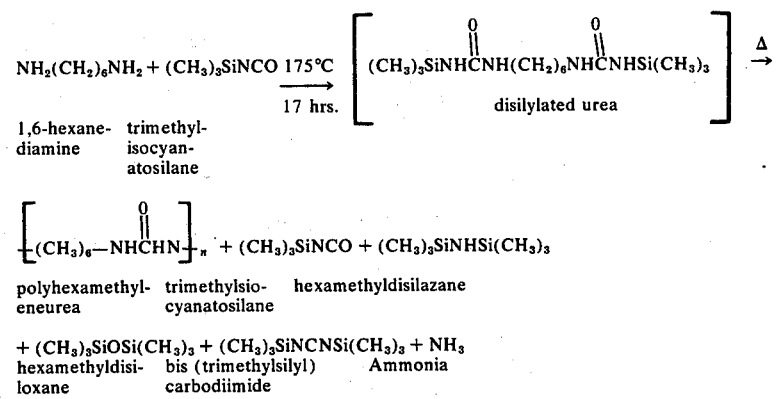

While the method of making polyureas has been illustrated by the reaction of 1,6-hexanediamine with trimethylisocyanatosilane, it is to be understood that other polyureas may be made by reacting other aliphatic diamines with trimethylisocyanatosilane. For example, tetramethylenediamine (1,4-butanediamine) may be used similarly to produce polytetramethyleneurea; pentamethylenediamine (1,5-pentanediamine) may be used similarly to produce polypentamethyleneurea; and decamethylenediamine (1,10-decanediamine) may be used similarly to produce polydecamethyleneurea.

Although the preferred embodiment of the invention has been described in terms of the use of a hermetically sealed Pyrex tube as the pressurized vessel in which the reaction is carried out, it is to be understood that other types of closed, pressurized vessels may be employed in carrying out the reaction. If desired, the vessel may be partially evacuated and, if desirable, swept out with an inert gas, such as nitrogen, to remove substantially all of the oxygen from the reaction vessel. However, this was not found necessary in the case of the production of polyhexamethyleneurea.

The polyureas product in accordance with the method of the invention are useful for impregnating and for coating fabrics of various types, and in dyeing and finishing various textile materials. They are also useful as binders in the manufacture of paper products. They may also be converted into films which may be used as protective barrier materials to protect moisture-sensitive materials against moist atmospheres and to prevent corrosion of metals which are subject to the corrosive action of moisture or atmospheric chemicals.

The method of the invention has the advantage that it permits recovery of substantial amounts of one of the more expensive reagents employed in the method and, therefore, provides a relatively inexpensive method of producing polyureas, which constitute a special class of polyamides, namely the polyamides of the lowest dicarboxylic acid, carbonic acid. In general, the polyureas have quite high melting points compared with polyamides comprised of the same length aliphatic chains in the diamine portions of the molecules and longer aliphatic chains in the dicarboxylic acid portions of the molecules.

It will be understood, of course, that various changes in the details and materials which have been described in order to explain the nature of the invention, may be made by those skilled in the art within the principle and scope of the invention.

I claim:

1. Method of making a polyurea which comprises reacting an aliphatic diamine with trimethylisocyanatosilane in a closed, pressurized vessel at a temperature sufficiently high and for a time sufficiently long to produce a substantial quantity of said polyurea and separating said polyurea from by-products of the reaction.

2. Method according to claim 1, wherein said aliphatic diamine is selected from the group consisting of 1,4-butanediamine, 1,5-pentanediamine, 1,6-hexanediamine, and 1,10-decanediamine.

3. Method according to claim 1, wherein said aliphatic diamine is 1,6-hexanediamine and said polyurea is polyhexamethyleneurea.

4. Method according to claim 3, wherein said temperature of said reaction is about 175°C.

5. Method according to claim 4, wherein said time of reaction is about 17 hours.

* * * * *